United States Patent [19]

Matino et al.

[11] Patent Number: 5,121,235
[45] Date of Patent: Jun. 9, 1992

[54] LIQUID CRYSTAL DISPLAY DEVICE HAVING LIGHT TRANSMISSION CONTROL LAYER

[75] Inventors: Haruhiro Matino, Tokoyto; Toshihiro Ueki, Machida, both of Japan

[73] Assignee: International Business Machines Corporation, Armonk, N.Y.

[21] Appl. No.: 454,333

[22] Filed: Dec. 21, 1989

[30] Foreign Application Priority Data

Dec. 21, 1988 [JP] Japan .................. 63-320564

[51] Int. Cl.$^5$ .................. G02F 1/13
[52] U.S. Cl. .................. 359/54; 359/62; 359/64; 359/68; 340/784; 340/793
[58] Field of Search .................. 350/333, 339 F, 332, 350/339 R; 340/784, 793

[56] References Cited

U.S. PATENT DOCUMENTS

| | | | |
|---|---|---|---|
| 3,626,241 | 12/1971 | Ngo | 315/167 |
| 4,486,785 | 12/1984 | Lasher et al. | 340/793 |
| 4,495,492 | 1/1985 | Anderson et al. | 340/793 |
| 4,531,160 | 7/1985 | Ehn | 340/793 |
| 4,600,274 | 7/1986 | Morozumi | 350/339 F |
| 4,712,877 | 12/1987 | Okada et al. | 350/334 |
| 4,765,720 | 8/1988 | Toyono et al. | 350/333 |
| 4,791,417 | 12/1988 | Bobak | 340/793 |
| 4,840,460 | 6/1989 | Bernot et al. | 350/333 |
| 4,867,537 | 9/1990 | Aoki et al. | 350/339 |
| 4,892,391 | 1/1990 | Stewart et al. | 350/339 F |
| 4,921,334 | 5/1990 | Akodes | 350/333 |

FOREIGN PATENT DOCUMENTS

| | | | |
|---|---|---|---|
| 01799225 | 5/1986 | European Pat. Off. | 350/339 F |
| 0271960 | 6/1988 | European Pat. Off. | 350/333 |
| 52-76897 | 6/1977 | Japan | 340/793 |
| 58-220185 | 12/1983 | Japan | 350/333 |
| 60-188924 | 9/1985 | Japan | 350/333 |
| 63-241528 | 10/1988 | Japan | 340/785 |
| 1-214898 | 8/1989 | Japan | 340/784 |

OTHER PUBLICATIONS

Epelboin, "Simulation of Photographs on a Storage display . . . ", J. Appl. Cryst., May 22, 1978, vol. 11, pp. 675–680.

Thompson, "Skew Coding Technique for Digital Halftones", IBM technical disclosure bulletin, vol. 20, No. 1, Jun. 1977.

Primary Examiner—Rolf Hille
Assistant Examiner—Minhloan Tran
Attorney, Agent, or Firm—Bernard E. Shay; David Aker

[57] ABSTRACT

A liquid crystal display device which allows a multi-gradation display to be attained by selectively applying or removing a fixed voltage to the liquid crystal, eliminating the necessity of substantially increasing the display unit area or finely adjusting the value of the voltage applied to the liquid crystal of each pixel to obtain multiple gradations in display level. In a liquid crystal display device in which the application of a voltage to a liquid crystal for each pixel is controlled, in accordance with the present invention, one display unit comprises n (n is a positive integer) adjacent pixels. A light transmission factor control layer for controlling the light transmission factor of the pixel is provided for each pixel. The ratio between light transmission factors of light transmission factor control layers of n pixels in a display unit is set as follows: $2^0:2^1:2^2 \ldots 2^{n-1}$ where the number of gradations is $2^n$.

16 Claims, 5 Drawing Sheets

RELATIVE BRIGHTNESS 0    RELATIVE BRIGHTNESS 1    RELATIVE BRIGHTNESS 2    RELATIVE BRIGHTNESS 4

FIG. 6(e) FIG. 6(f) FIG. 6(g) FIG. 6(h)

RELATIVE BRIGHTNESS 3    RELATIVE BRIGHTNESS 5    RELATIVE BRIGHTNESS 6    RELATIVE BRIGHTNESS 7

FIG. 7

PRIOR ART

LIQUID CRYSTAL DISPLAY DEVICE HAVING LIGHT TRANSMISSION CONTROL LAYER

The present invention relates, in general, to a liquid crystal device for multigradation display and, more particularly, to a liquid crystal display including display units with multiple pixels having distinct transmission levels.

BACKGROUND OF THE INVENTION

Since the light transmission factor of a liquid crystal varies with the voltage applied to the liquid crystal, it is theoretically possible to obtain a desired gradation (gray scale level) by varying the voltage applied across a liquid crystal cell.

However, the change in the light transmission factor of a liquid crystal is large relative to the change in voltage applied to the liquid crystal. Therefore, displays using voltage changes to obtain gray scale require high precision electronic circuits to obtain multiple gradations by adjusting the voltage applied to the liquid crystal.

A liquid crystal display device is disclosed in Published Unexamined Japanese Patent Application (PUPA) No. 58-220185. In that display, one display unit 100 comprises four pixels 101, 102, 104, and 108. These pixels have area ratios of 1:2:4:8, resulting in a 16-gradation (gray scale level) display by the combination of the selection and non-selection of one or more of the four pixels.

Figure 7:
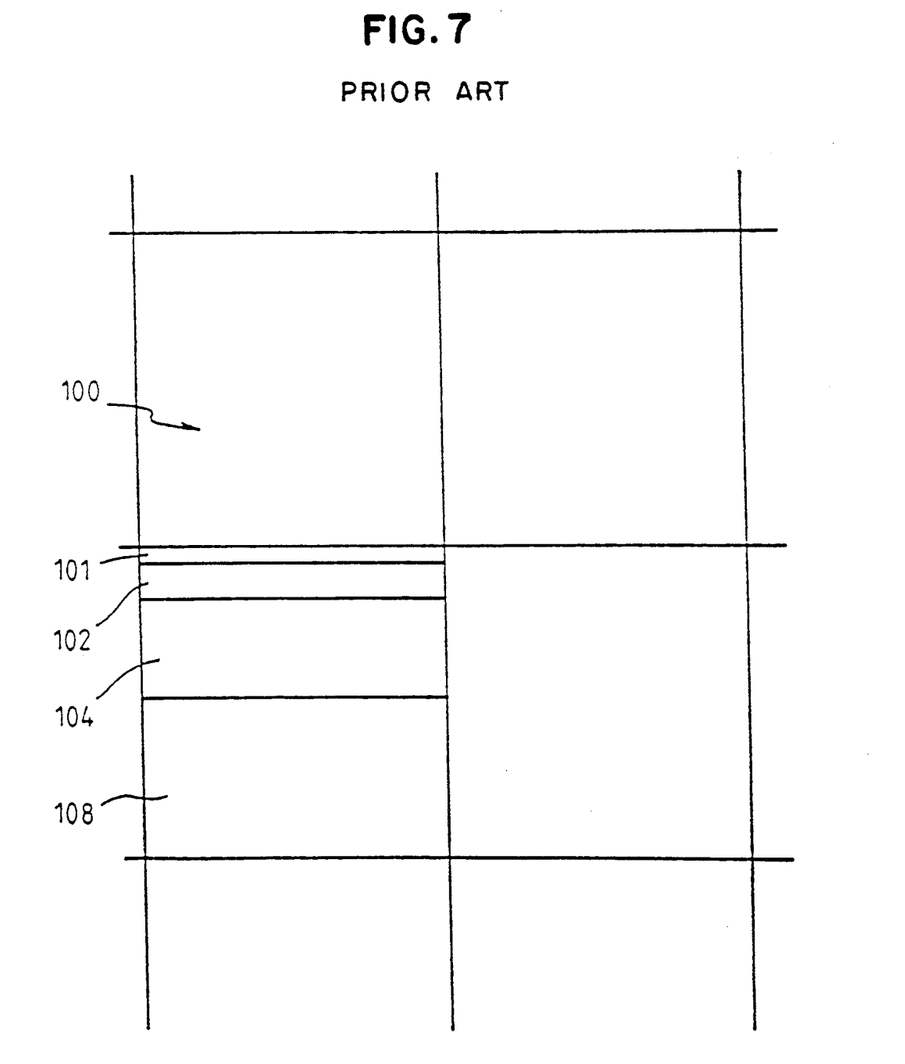
FIG. 7 is a diagram illustrating the relationship between the display unit and pixel size in one prior art device.

However, each display unit 100 of the device described in PUPA No. 58-220185 requires a pixel 108 (see FIG. 7) having an area eight times that of the pixel 101 (the smallest area). Therefore, the ability to reduce the area of a display unit is limited, thus reducing its utility in large area liquid crystal display devices with high resolution.

SUMMARY OF THE INVENTION

In a liquid crystal display device in which the application of a voltage to a liquid crystal for each pixel is controlled, in accordance with the present invention, one display unit comprises n (n is a positive integer) adjacent pixels. A light transmission factor control layer for controlling the light transmission factor of the pixel is provided for each pixel. The ratio between light transmission factors of light transmission factor control layers of n pixels in a display unit is set as follows: $2^0:2^1:2^2 \ldots 2^{n-1}$ where the number of gradiations is $2^n$.

The present invention thus provides a liquid crystal display device which allows a multi-gradation display to be attained by selectively applying or removing a fixed voltage to the liquid crystal, eliminating the necessity of substantially increasing the display unit area and the necessity of finely adjusting the value of the voltage applied to the liquid crystal of each pixel.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

FIGS. 3(a)-3(p) illustrate the sixteen possible transmission levels using a four pixel display unit according to the present invention.

FIGS. 6(a)-6(h) illustrate the eight possible transmission levels for a three pixel display unit according to the present invention.

DESCRIPTION OF THE PREFERRED EMBODIMENTS

Figure 2:
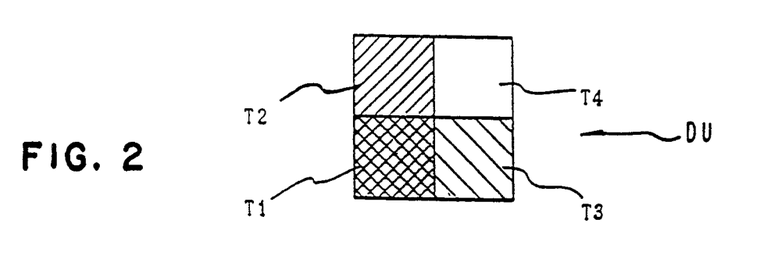
FIG. 2 illustrates a four pixel display unit according to the present invention.

In the embodiment of FIG. 2, the display unit (DU) of a liquid crystal display device is a square composed of four pixels T1, T2, T3, and T4 located at positions formed by dividing the square display unit into four equal parts.

Figure 1:
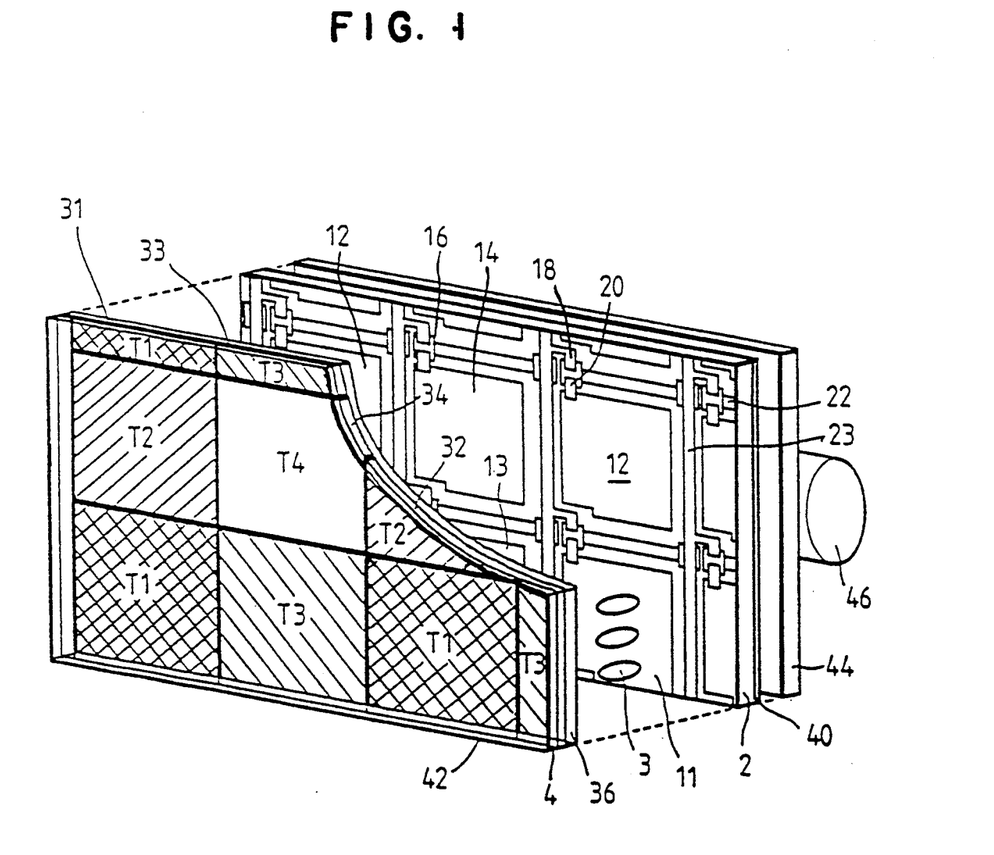
FIG. 1 is a perspective view of one embodiment of a liquid crystal display device according to the present invention.

Referring to FIG. 1, regions corresponding to pixels T1, T2, T3, and T4 in FIG. 2 on transparent glass substrate 2 (the TFT array substrate) are provided with transparent pixel electrodes 11, 12, 13, and 14 (made of, for example, indium tin oxide—hereinafter called ITO). Pixel electrodes 11, 12, 13, and 14 are respectively connected to source electrodes 20 of thin-film transistors (hereinafter called TFTs) 16. TFT 16 may be made of, for example, amorphous silicon (a-Si). Each TFT controls the application of a voltage to a liquid crystal in the pixel region. TFT 16 is connected at its gate electrode (not shown) to address wiring 22, and at its drain electrode 18 to data wiring 23. A liquid crystal orientation film (not shown) is provided covering the whole of the substrate 2 inside pixel electrode 12.

A transparent glass substrate 4 (called the counter substrate) is disposed opposite to the TFT array substrate 2. Inside counter substrate 4 (that is, on the side toward the TFT array substrate 2), light transmission factor control layers 31, 32, 33, and 34 are provided. Light transmission factor control layers 31, 32, 33, and 34 are disposed in the regions of the pixel T1, T2, T3, and T4 (shown in FIG. 2), respectively, and the ratio of the light transmission factors of the layers is set to $2^0:2^1:2^2:2^3$, that is, 1:2:4:8.

Inside the light transmission factor control layers 31, 32, 33, and 34 (that is, on the side toward the TFT array substrate), common electrode 36 is provided covering the surface of counter substrate 4. Inside common electrode 36, a liquid crystal orientation film (not shown) is provided over the surface of the substrate 4. A layer of liquid crystal material 3 lies between TFT array substrate 2 and the counter substrate 4, and, more particularly, between an orientation film provided on pixel electrodes 11, 12, 13, and 14 and an orientation film provided on common electrode 36. At the rear of TFT array substrate 2 is provided a back illumination source 46. Outside TFT array substrate 2 (that is, on the side toward back illumination source 46) is provided a polarizing plate 40. Between the back illumination source 46 and polarizing plate 40 is a diffusion plate 44 for diffusing light. Also, outside counter electrode 4 (that is, on the opposite TFT array substrate 2) is provided a polarizing plate 42.

Upon the application of a gate pulse to the address wiring 22, the TFT (16) connected to address wiring 22 is placed in the ON state, and a data voltage on the data wiring 23 at that time is applied to the liquid crystal 3. If the polarizing directions of plates 40 and 42 of the liquid crystal display device shown in FIG. 1 are parallel to each other and the molecular axis of the liquid crystal is twisted by 90 degrees when no voltage is applied to the liquid crystal 3 preventing light from passing through the cell. Application of voltage to liquid crystal 3, will orient the molecular axis of the liquid crystal parallel, allowing light to pass through the liquid crystal. If the directions of polarizing plates 40 and 42 of the liquid crystal display device in FIG. 1 are perpendicular to each other, and the molecular axis of the liquid crystal is twisted by 90 degrees when no voltage is applied to the liquid crystal 3, the liquid crystal allows light to pass through the cell in the absence of an applied voltage. When a voltage is applied to the liquid crystal, the molecular axes of the liquid crystal are oriented parallel to each other and light does not pass through the cell. In either case, the ON-OFF control of the TFT 16 allows the light transmission and interception through the liquid crystal of each pixel to be controlled.

In this way, the application of voltages to pixels T1, T2, T3, and T4 can be independently controlled by TFT 16, and, therefore, the light transmission and interception can be also independently controlled. Accordingly, sixteen different combinations of light transmission and interception in the pixels T1, T2, T3, and T4 are available, as shown in FIG. 3. FIG. 3 is a diagram illustrating that the combinations of the light transmission and interception of four pixels in one display unit of the liquid crystal display device shown in FIG. 1 allow 16 gradations to be obtained.

Figure 3A:
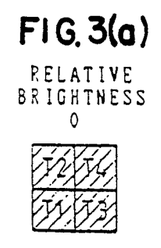

FIG. 3(a) shows a state in which all of the pixels T1, T2, T3, and T4 intercept light. The amount of light transmission of the whole display unit (DU) in this case is as follows, as a relative value:

$$\frac{0}{1+2+4+8} = \frac{0}{15}$$

Figure 3B:
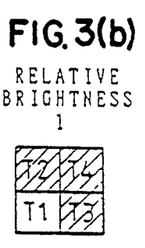

FIG. 3(b) shows a state in which the pixel T1 allows light to pass through it, and the pixels T2, T3, and T4 intercept light. The amount of light transmission of the whole display unit (DU) in this case is as follows, as a relative value:

$$\frac{1}{1+2+4+8} = \frac{1}{15}$$

Figure 3C:
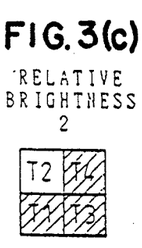

FIG. 3(c) shows a state in which the pixel T2 allows light to pass through it and the pixels T1, T3, and T4 intercept light. The amount of light transmission of the whole display unit (DU) in this case is as follows, as a relative value:

$$\frac{2}{1+2+4+8} = \frac{2}{15}$$

Figure 3D:
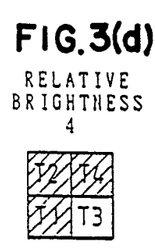

FIG. 3(d) shows a state in which the pixel T3 allows light to pass through it and the pixels T1, T2, and T4 intercept light. An amount of light transmission of the whole display unit (DU) in this case is as follows, as a relative value:

$$\frac{4}{1+2+4+8} = \frac{4}{15}$$

Figure 3E:
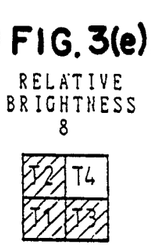

FIG. 3(e) shows a state in which the pixel T4 allows light to pass through it and the pixels T1, T2, and T3 intercept light. The amount of light transmission of the whole display unit (DU) in this case is as follows, as a relative value:

$$\frac{8}{1+2+4+8} = \frac{8}{15}$$

Figure 3F:
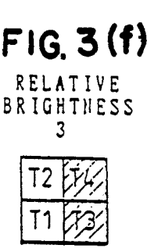

FIG. 3(f) shows a state in which the pixels T1 and T2 allow light to pass through them and the pixels T3 and T4 intercept light. The amount of light transmission of the whole display unit (DU) in this case is as follows, as a relative value:

$$\frac{1+2}{1+2+4+8} = \frac{3}{15}$$

Figure 3G:
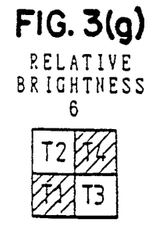

FIG. 3(g) shows a state in which the pixels T2 and T3 allow light to pass through them and the pixels T1 and T4 intercept light. The amount of light transmission of the whole display unit (DU) in this case is as follows, as a relative value:

$$\frac{2+4}{1+2+4+8} = \frac{6}{15}$$

Figure 3H:
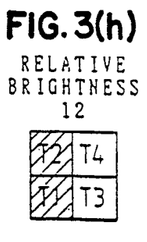

FIG. 3(h) shows a state in which the pixels T3 and T4 allow light to pass through them and the pixels T1 and T2 intercept light. The amount of light transmission of the whole display unit (DU) in this case is as follows, as a relative value:

$$\frac{4+8}{1+2+4+8} = \frac{12}{15}$$

Figure 3I:
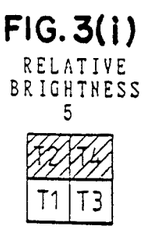

FIG. 3(i) shows a state in which the pixels T1 and T3 allow light to pass through them and the pixels T2 and T4 intercept light. The amount of light transmission of the whole display unit (DU) in this case is as follows, as a relative value:

$$\frac{1+4}{1+2+4+8} = \frac{5}{15}$$

Figure 3J:
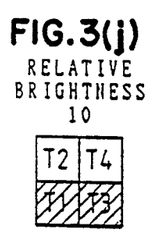

FIG. 3(j) shows a state in which the pixels T2 and T4 allow light to pass through them and the pixels T1 and T3 intercept light. The amount of light transmission of the whole display unit (DU) in this case is as follows, as a relative value:

$$\frac{2+8}{1+2+4+8} = \frac{10}{15}$$

Figure 3K:
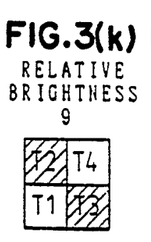

FIG. 3(k) shows a state in which the pixels T1 and T4 allow light to pass through them and the pixels T2 and T3 intercept light. The amount of light transmission of the whole display unit (DU) in this case is as follows, as a relative value:

$$\frac{1+8}{1+2+4+8} = \frac{9}{15}$$

Figure 3L:
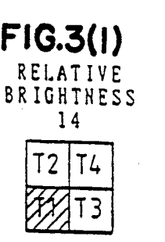

FIG. 3(*l*) shows a state in which the pixels T2, T3, and T4 allow light to pass through them and the pixel T1 intercepts light. The amount of light transmission of the whole display unit (DU) in this case is as follows, as a relative value:

$$\frac{2+4+8}{1+2+4+8} = \frac{14}{15}$$

Figure 3M:
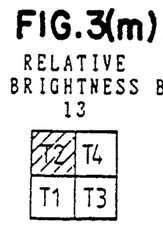

FIG. 3(*m*) shows a state in which the pixels T1, T3, and T4 allow light to pass through them and the pixel T2 intercepts light. The amount of light transmission of the whole display unit (DU) in this case is as follows, as a relative value:

$$\frac{1+4+8}{1+2+4+8} = \frac{13}{15}$$

Figure 3N:
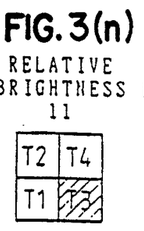

FIG. 3(*n*) shows a state in which the pixels T1, T2, and T4 allow light to pass through them and the pixel T3 intercepts light. The amount of light transmission of the whole display unit (DU) in this case is as follows, as a relative value:

$$\frac{1-2+8}{1+2+4+8} = \frac{11}{15}$$

Figure 3O:
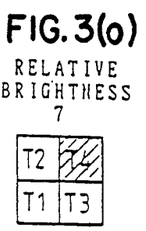

FIG. 3(*o*) shows a state in which the pixels T1, T2, and T3 allow light to pass through them and the pixel T4 intercepts light. The amount of light transmission of the whole display unit (DU) in this case is as follows, as a relative value:

$$\frac{1+2+4}{1+2+4+8} = \frac{7}{15}$$

Figure 3P:
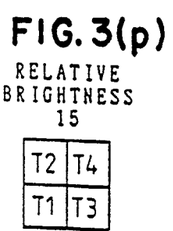

FIG. 3(*p*) shows a state in which all the pixels T1, T2, T3, and T4 allow light to pass through them. The amount of light transmission of the whole display unit (DU) in this case is as follows, as a relative value:

$$\frac{1+2+4+8}{1+2+4+8} = \frac{15}{15}$$

If the ratio of the light transmission factors of pixels T1, T2, T3, and T4 are 1:2:4:8 respectively, the combination of light transmission and interception (light is intercepted when the pixel is off) of pixels T1, T2, T3, and T4 results in 16 relative levels of light transmission: 0/15, 1/15, 2/15, 3/15, 4/15, 5/15, 6/15, 7/15, 8/15, 9/15, 10/15, 11/15, 12/15, 13/15, 14/15, and 15/15. Thus 16 gradations (gray levels) may be attained.

In order to make the ratio of the light transmission factors of pixels T1, T2, T3, and T4 equal approximatly 1:2:4:8, the transmission factors of light transmission factor control layers 31, 32, 33, and 34 need only be, for example, 12.5%, 25.0%, 50.0%, and 100%. These transmission factors may be realized, for example, by controlling the amount of carbon black dispersed into the acrylic resin.

For example, an standard solution (hereinafter called a STD solution) produced by adding a photopolymerization initiator and carbon black to acrylic resin and performing viscosity adjustment, and dilution thereof may be rotatively applied by painting at speeds of 520 RPM and 900 RPM, resulting in light transmission factors of 12.5% and 25.0%. When a STD solution diluted in such a manner that the carbon black component amounts to 30% is rotated at a speed of 650 RPM, a light transmission factor of 50.0% may be obtained.

Figure 4:
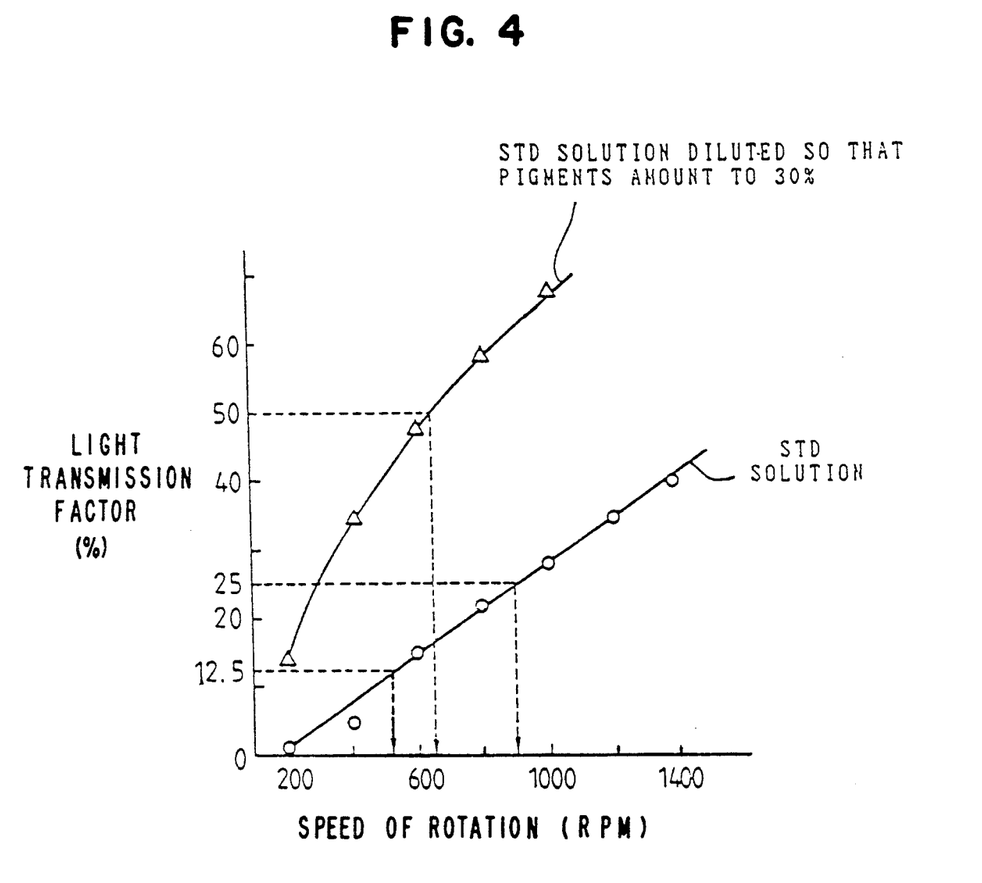
FIG. 4 is a graph of light transmission factor vs. number of rotations where the required light transmission factor is obtained by rotative painting.

FIG. 4 illustrates the relationship between the revolutions per minute and light transmission factor where the light transmission factor is obtained by rotative painting. As described above, if resin components are provided with photosensitivity by adding a photopolymerization initiator, patterns can be obtained by development. Resin components having no photosensitivity are painted thereon with a photoresist, applied with patterning by use of a conventional technique, and processed by etching.

Figure 5:
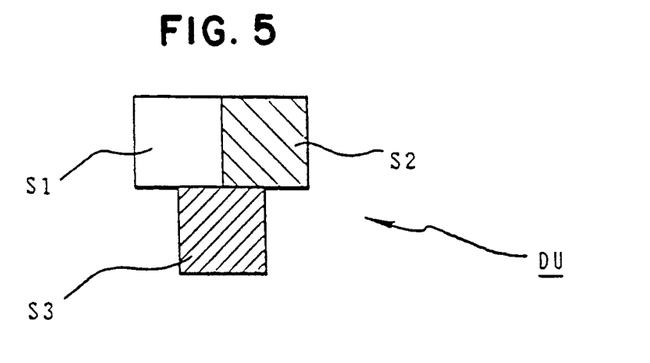
FIG. 5 illustrates a three pixel display unit according to the present invention.

FIG. 5 illustrates one possible arrangement of pixels in the case where one display unit DU is composed of three adjacent pixels. Three square-shaped pixels S1, S2, and S3, located at each apex of a inverse regular triangle, compose one display unit, and the ratio of its light transmission factors is $2^0:2^1:2^2$ that is, 1:2:4.

In this arrangement of pixels, eight combinations of the light transmission and interception of the pixels S1, S2, and S3 are available, as shown in FIG. 6. FIG. 6 is a diagram illustrating that the combinations of light transmission and interception of the three pixels in the display unit shown in FIG. 5 allow eight gradations to be obtained.

Figure 6A:
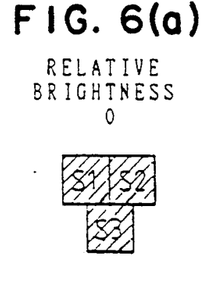

FIG. 6(*a*) shows a state in which all of the pixels S1, S2, and S3 intercept light. The amount of light transmission of the display unit (DU) in this case is as follows, as a relative value:

$$\frac{0}{1+2+4} = \frac{0}{7}$$

Figure 6B:
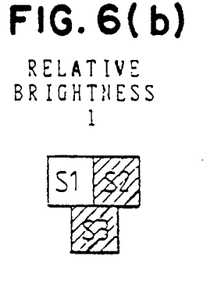

FIG. 6(*b*) shows a state in which the pixel S1 allows light to pass through it and the pixels S2 and S3 intercept light. The amount of light transmission of the display unit (DU) in this case is as follows, as a relative value:

$$\frac{1}{1+2+4} = \frac{1}{7}$$

Figure 6C:
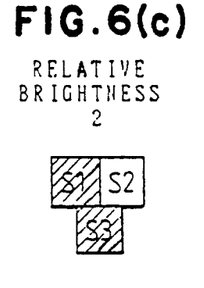

FIG. 6(*c*) shows a state in which the pixel S2 allows light to pass through it and the pixels S1 and S3 intercept light. The amount of light transmission of the display unit (DU) in this case is as follows, as a relative value:

$$\frac{2}{1+2+4} = \frac{2}{7}$$

Figure 6D:
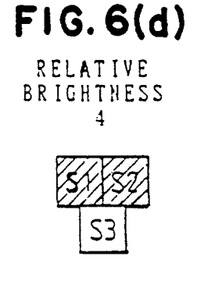

FIG. 6(*d*) shows a state in which the pixel S3 allows light to pass through it and the pixels S1 and S2 intercept light. The amount of light transmission of the display unit (DU) in this case is as follows, as a relative value:

$$\frac{4}{1+2+4} = \frac{4}{7}$$

Figure 6E:
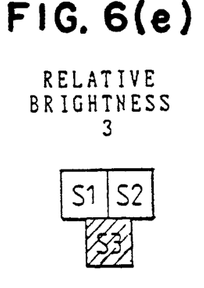

FIG. 6(*e*) shows a state in which the pixels S1 and S2 allow light to pass through them and the pixel S3 intercepts light. The amount of light transmission of the display unit (DU) in this case is as follows, as a relative value:

$$\frac{1+2}{1+2+4} = \frac{3}{7}$$

Figure 6F:
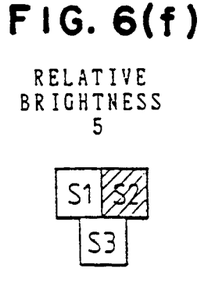

FIG. 6(f) shows a state in which the pixels S1 and S3 allow light to pass through them and the pixel S2 intercepts light. The amount of light transmission of the display unit (DU) in this case is as follows, as a relative value:

$$\frac{1+4}{1+2+4} = \frac{5}{7}$$

Figure 6G:
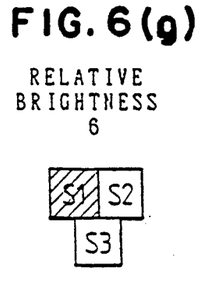

FIG. 6(g) shows a state in which the pixels S2 and S3 allow light to pass through them and the pixel S1 intercepts light. The amount of light transmission of the display unit (DU) in this case is as follows, as a relative value:

$$\frac{2+4}{1+2+4} = \frac{6}{7}$$

Figure 6H:
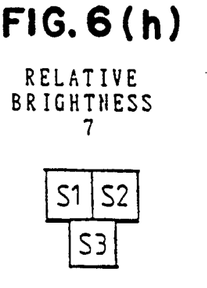

FIG. 6(h) shows a state in which all the pixels S1, S2, and S3 allow light to pass through them. The amount of light transmission of the display unit (DU) in this case is as follows, as a relative value:

$$\frac{1+2+4}{1+2+4} = \frac{7}{7}$$

In this way, even if three pixels compose one display unit, if the ratio of the light transmission factors of the three pixels is 1:2:4, the combinations of the light transmission and interception of the three pixels results in 8 relative levels of light transmission: 0/7, 1/7, 2/7, 3/7, 4/7, 5/7, 6/7 and 7/7. Thus eight gradiations (gray levels) may be attained.

The above-mentioned embodiments are those in the cases where one display unit is composed of either three or four pixels. The present invention is not limited by the number of these pixels, and can be applied to the case where one display unit is composed of n (n is a positive integer) pixels. In other words, the pixels forming one display unit are either ON (light transmission) or OFF (light interception). Thus when the ratio of the light transmission factors of the pixels of a display unit are selected in accordance with the exponential function $2^x$ (where x=0, 1, 2, ...), the multi-gradations become substantially linear. Accordingly, the ratio of light transmission factors of n pixels needs only be $2^0:2^1:2^2 ... 2^{n-1}$.

In the above-mentioned embodiment, a TFT is employed as the switching element which controls the application of voltage to the liquid crystal material in a pixel domain. However, the present invention is not limited to TFT switches, for example, MIM (metal-insulator-metal) switching elements may be employed.

The present invention is also applicable to active matrix type liquid crystal, as described above and to other types of display, including simple matrix type liquid crystal display. In a simple matrix type, the application of voltages to pixels in the region where an X electrode and a Y electrode intersect controls light transmission and interception for liquid crystals in the pixel region concerned.

In addition, the light transmission factor control layer provided on the side of the counter electrode 4 in FIG. 1, may be provided on the pixel electrodes on the substrate which includes the switching elements such as the TFT.

The present invention is a multi-gradation display which does not require enlarging an area in one display unit, or of finely adjusting the voltages applied to the liquid crystals in each pixel.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What we claim is:

1. A liquid crystal display device comprising:
   a plurality of display units, composed of n adjacent pixels, where n is a positive integer, the pixels in each display unit being substantially coplanar so as to define a first plane;
   means for applying a control voltage to each of said pixels;
   a light transmission control layer having a light transmission factor for each pixel for controlling a relative amount of light transmission from the pixel so that light provided by successive pixels in said display unit is reduced with respect to light provided by a previous pixel, said control layer being disposed in a second plane parallel to and adjacent said first plane; and
   a ratio between the light transmission factors of the control layers for the n pixels in one display unit being $2^0:2^1:2^2 ... 2^{n-1}$.

2. A display unit of claim 1 comprising:
   a first pixel including a first light transmission control layer having a first light transmission factor for controlling a relative amount of light transmission from said first pixel;
   a second pixel including a second light transmission control layer having a second light transmission factor approximately 2 times that of said first light transmission factor;
   a third pixel including a third light transmission control layer having a third light transmission factor approximately 4 times that of said first light transmission factor.

3. A display unit according to claim 2 further comprising:
   a fourth pixel including a fourth light transmission control layer having a fourth light transmission factor approximately 8 times said first light transmission factor.

4. A display unit of claim 1 comprising:
   a first pixel including a first light transmission control layer having a light transmission factor of approximately 100 percent;
   a second pixel including a second light transmission control layer having a relative light transmission factor of approximately 50 percent;
   a third pixel including a third light transmission control layer having a light transmission factor of approximately 25 percent.

5. A display unit according to claim 4 further comprising:

a fourth pixel including a second light transmission control layer having a relative light transmission factor of approximately 12.5 percent.

6. The liquid crystal display device of claim 1, wherein the pixels in each display unit are of substantially equal area.

7. A liquid crystal device comprising:
a plurality of display units;
each of said display units including n adjacent pixels where n is a positive integer, the pixels in each display unit being substantially coplanar so as to define a first plane;
each of said pixels including a respective light transmission control layer for controlling a relative amount of light transmission from one of said pixels, said respective control layers being disposed in a second plane parallel to and adjacent said first plane, wherein each respective light transmission layer transmits light with a respective transmission factor, and wherein said respective light transmission factors are successive powers of a predetermined ratio.

8. The liquid crystal display device of claim 7, wherein the pixels in each display unit are of substantially equal area.

9. The liquid crystal display device of claim 7, wherein the pixels in each display unit are substantially coplanar.

10. A liquid crystal display device according to claim 7 wherein the respective light transmission factors are all different from one another.

11. A liquid crystal display device according to claim 7 wherein the light transmission factors have ratios of $2^0:2^1:2^2:2^3: \ldots 2^{n-1}$.

12. A display unit comprising:
n substantially coplanar pixels disposed in a first plane;
a respective light transmission control layer for each pixel disposed in a second plane adjacent and parallel to said first plane;

a first pixel including a first light transmission control layer having a relative light transmission factor of approximately 1;
a second pixel including a second light transmission control layer having a relative light transmission factor of approximately 2; and
a third pixel including a third light transmission control layer having a relative light transmission factor of approximately 4.

13. A display unit according to claim 12 further comprising:
a fourth pixel including a fourth light transmission control layer having a relative light transmission factor of approximately 8.

14. The display unit of claim 12, wherein the pixels in each display unit are of substantially equal area.

15. A liquid crystal display comprising:
a plurality of display units, each display unit including n pixels, the pixels in each display unit being substantially coplanar so as to define a first plane;
said pixels each including a respective light transmission control layer disposed in a second plane parallel to and adjacent said first plane, each said respective control layer having a predetermined light transmission factor for controlling a relative amount of light transmission from a pixel;
a first of said pixels in one of said display units including a light transmission control layer which is more transmissive than said light transmission control layers of said other pixels in said one display unit; and
a second of said pixels in said one display unit including a light transmission control layer which is less transmissive than said light transmission control layer of any of said other pixels in said one display unit;
said light transmission control layer of said first pixel having a transmission factor $2^{n-1}$ greater than said transmission control layer of said second pixel.

16. The liquid crystal display device of claim 9, wherein the pixels in each display unit are of substantially equal area.

* * * * *